July 2, 1957  C. L. HOGAN  2,798,205
MAGNETICALLY CONTROLLABLE TRANSMISSION SYSTEM
Filed May 28, 1952  3 Sheets-Sheet 1
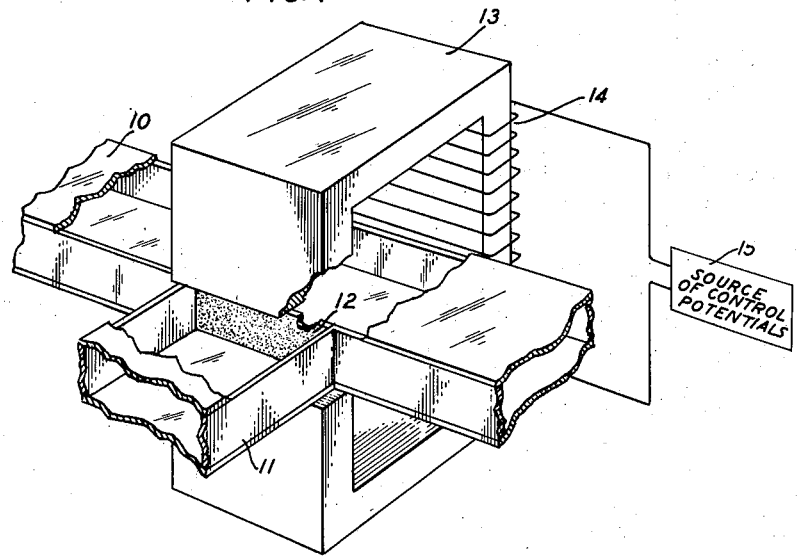
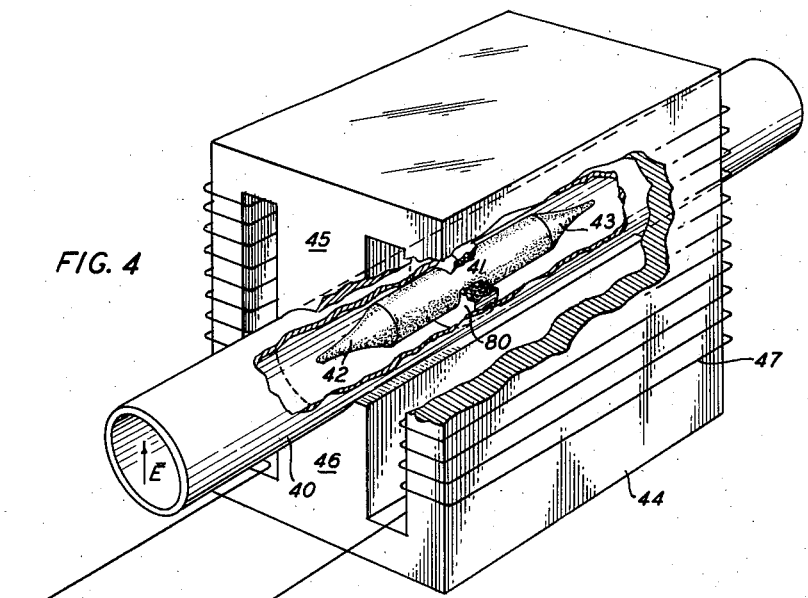
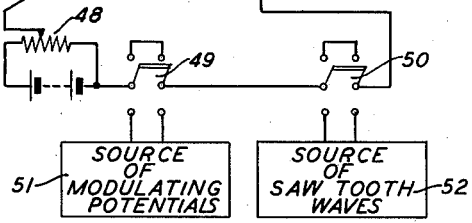
INVENTOR
C. L. HOGAN
BY
Franklin Mohr
ATTORNEY

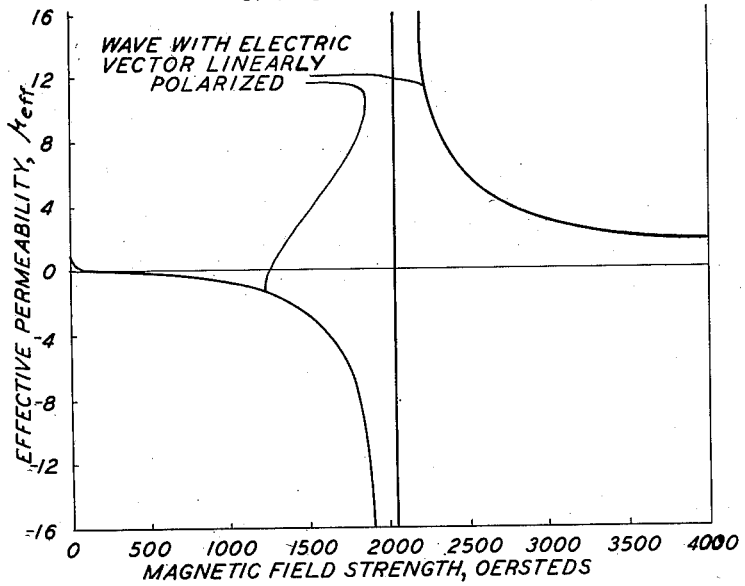
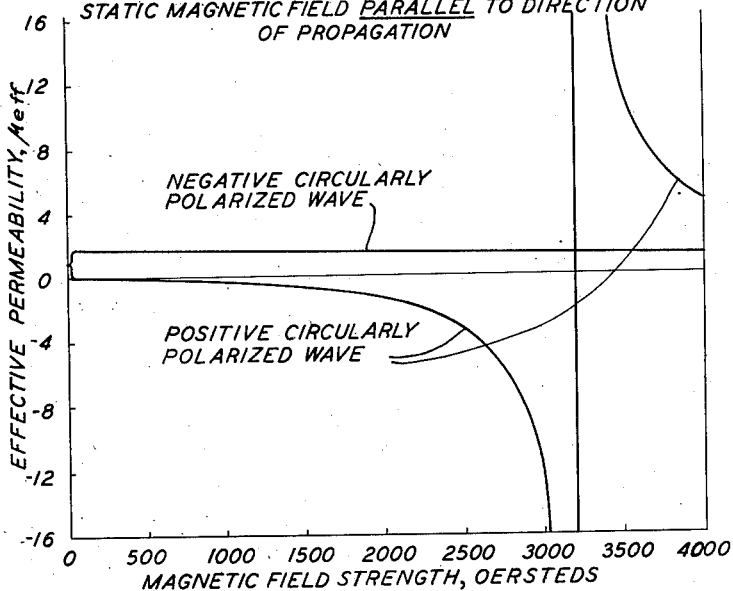

July 2, 1957 C. L. HOGAN 2,798,205
MAGNETICALLY CONTROLLABLE TRANSMISSION SYSTEM
Filed May 28, 1952 3 Sheets-Sheet 3

INVENTOR
C. L. HOGAN
BY
Franklin Mohr
ATTORNEY

United States Patent Office 2,798,205
Patented July 2, 1957

2,798,205

MAGNETICALLY CONTROLLABLE TRANSMISSION SYSTEM

Clarence L. Hogan, Madison, N. J., assignor to Bell Telephone Laboratories, Incorporated, New York, N. Y., a corporation of New York Application May 28, 1952, Serial No. 290,600

7 Claims. (Cl. 333—7)

This invention relates to devices for controlling and modifying the transmission of electromagnetic waves and more particularly to the use of ferromagnetic materials in static magnetizing fields of suitable value and direction to render the ferromagnetic material transparent to or strongly reactive to impressed electromagnetic waves of a particular frequency and field pattern.

An object of the invention is to render a solid element such as a piece of ferromagnetic material either substantially transparent to impressed electromagnetic waves or reflective to such waves under control of an impressed static magnetizing field.

Another object of the invention is to vary the phase shift of an electromagnetic wave in a wave guide over a wide range of values under the control of the impressed magnetizing field.

A further object of the invention is to convert a linearly polarized wave into a circularly polarized wave in a novel manner.

When an electromagnetic wave is impressed in suitable manner upon a ferromagnetic medium which is magnetized to saturation along a fixed direction, the effective permeability of the medium with respect to the impressed wave can be varied over a wide range including positive and negative values by varying the strength of the steady magnetizing field. In this way the impedance of the medium to the wave and the propagation constant of the wave in the medium can be controlled over a correspondingly wide range. In ferromagnetic material a resonance condition is found to occur at a particular field strength which is dependent upon the frequency and field pattern of the impressed wave, this condition being known as gyromagnetic resonance.

It has been known heretofore to use the gyromagnetic resonance phenomenon to produce variable attenuation due to variable absorption of energy by the medium in the immediate neighborhood of the resonance. It has been found possible also to improve the effective conductivity of a ferromagnetic medium in the region of relatively small (less than unity) values of effective permeability.

In accordance with the present invention the effective permeability of a ferromagnetic medium is made to equal the effective dielectric constant of the medium in order to render the medium substantially as transparent as air, vacuum, or free space, to the transmission of electromagnetic waves. In this way some ferrites have been made essentially transparent with no material reflection or absorption. An impedance match between a ferromagnetic medium and a dielectric medium having an intrinsic impedance different from air may be effected by making the ratio between the effective permeability and the effective dielectric constant the same for both media.

In addition, certain ferromagnetic media, such as many ferrites, can be operated at relatively low magnetic field strengths to provide an electrically or magnetically controlled phase shifter for electromagnetic waves.

In the drawings:

Fig. 1 is a perspective view, partly broken away and partly schematic, showing a branching wave guide system with means for controlling transmission of waves to and from one of the branches;

Fig. 2 is a plot of the effective permeability of a ferromagnetic material as a function of magnetic field strength, for the case of transmission of electromagnetic waves that are linearly polarized as to the electric vector;

Fig. 3 is a plot like that of Fig. 2, but for the case of transmission of electromagnetic waves that are circularly polarized;

Fig. 4 is a perspective view, partly broken away and partly schematic, showing a wave guide system which may serve either as a modulator or as an electrically variable phase shifter;

Figure 5:
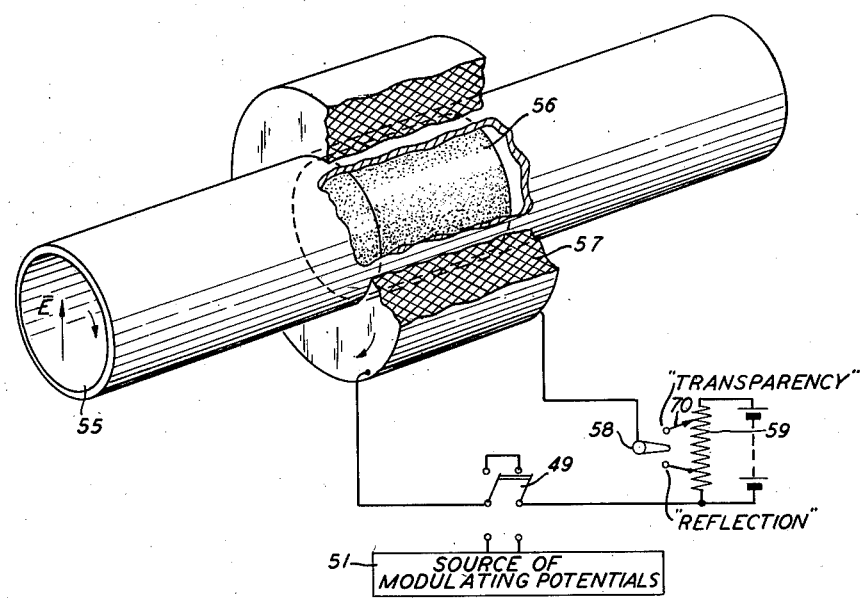
Figure 6:
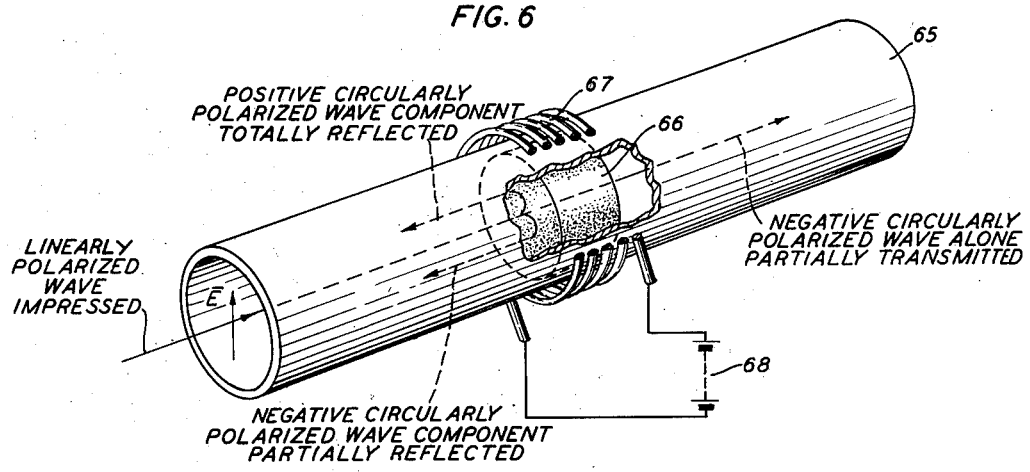

Fig. 5 is a perspective view, partly broken away and partly schematic, showing a wave guide system containing a plug of ferromagnetic material and means for rendering the plug either transparent or reflective or for continuously varying the degree of transparency of the plug when a positive circularly polarized wave is impressed thereon; and Fig. 6 is a perspective view, partly broken away and partly schematic, showing a wave guide system for converting a linearly polarized electromagnetic wave into a circularly polarized one.

Fig. 1 shows, in a branching arrangement of wave guides, a wave guide wall, partition, or window member which may be rendered substantially as transparent to electromagnetic waves as air or vacuum or may be matched in impedance to another dielectric medium by placing the member in a static magnetic field in a particular direction having a suitable magnitude. A main wave guide 10 is shown together with a branch wave guide 11. A portion of common wall between the guides 10 and 11 comprises a partition 12, which should be taken as illustrative also of a wall or window member. An electromagnet is provided having a core 13, a magnetizing winding 14 linked with the core, and a source 15 of control potentials connected to the winding for supplying suitable magnetizing currents thereto. The core 13 has a suitable air gap and is mounted with reference to the wave guide system 10, 11, in any suitable manner with the partition 12 suitably oriented in the air gap. The wave guide system 10, 11, is illustrated as being composed of hollow-pipe wave guide members of rectangular cross section, such as are commonly used for transmission of transverse electric waves having their electric vector parallel to the shorter side of the rectangular cross section. The mounting of the core and the position of the partition 12 in the air gap are such that the direction of the magnetic flux in the air gap is parallel to the direction of the electric vector, which direction is the same for waves either in the main wave guide 10 or in the branch wave guide 11. The direction of propagation of electromagnetic waves, whether in the main wave guide or in the branch wave guide, is in a plane perpendicular to the static magnetizing field in the air gap.

The material in the partition 12 is preferably a ferromagnetic metallic oxide. The partition may comprise a plate of the oxide or it may be made of powdered oxide in a suitable binder. A composition suitable for this use has been made by powdering sintered nickel-zinc ferrite until the largest particles pass a 40-mesh per inch screen, mixing this powder with small spheres of polystyrene which are fine enough also to pass a 40-mesh screen, in the proportion of 75 percent by volume of ferrite to 25 percent by volume of polystyrene, then slightly wetting the mixture with a dilute solution of polystyrene in benzene to render the mixture tacky and pressing the material into the desired shape in a die under five tons pressure.

To render the material of the partition 12 substantially transparent to electromagnetic waves in air and of a given frequency, the value of control potential impressed upon the winding is adjusted to make the effective high frequency permeability of the material equal to the effective high frequency dielectric constant of the material. The correct adjustment may be obtained by trial, with or without supplementary calculation. The magnetizing field required will generally be somewhat greater than that necessary to produce gyromagnetic resonance in the material. As will be shown hereinafter, the effective high frequency permeability of a ferromagnetic material for wave propagation in a direction perpendicular to the direction of the static magnetizing field is $$\mu_{eff} = \frac{\gamma^2 B_z^2 - \omega^2}{\gamma^2 H_z B_z - \omega^2}$$

which is derived hereinafter as Expression 16, where $\gamma$ is a constant known as the gyromagnetic ratio for electrons, $H_z$ is the effective static magnetizing field, assumed to be applied along the z-axis, $B_z$ is the saturation value of the magnetic flux, in the direction of the z-axis and $\omega$ is the angular frequency of the wave.

The frequency $f$ of gyromagnetic resonance is marked by an infinite value of $\mu_{eff}$ which occurs when the denominator $(\gamma^2 H_z B_z - \omega^2)$ becomes zero, that is, when $$\omega^2 = \gamma^2 H_z B_z$$

or $$\omega = \gamma \sqrt{H_z B_z}$$

or $$f = \frac{\gamma}{2\pi} \sqrt{H_z B_z}$$

At field strengths above resonance, the value of $\mu_{eff}$ is decreasing with field strength and, if $\mu_{eff}$ is substantially a real quantity, at some particular value of $H_z$ the value of $\mu_{eff}$ becomes equal to the value of the effective high frequency dielectric constant of the material. When this equality is obtained, the intrinsic impedance of the ferromagnetic medium, which depends upon the ratio of effective permeability to effective dielectric constant, becomes unity, which is the value of the intrinsic impedance of air or vacuum. Hence, when this equality is obtained the impedance of the ferromagnetic material is matched to that of air and the waves are transmitted as well as if the partition were merely so much air. To achieve this effect it is necessary that the material of the partition have negligible electrical conductance losses and dielectric losses and that the value of the static field at which the impedance matching would be expected to occur is sufficiently far from the gyromagnetic resonance point so that absorption of energy in the material by gyromagnetic resonance is negligible.

The ratio of unity as the criterion for impedance matching follows from the usual choice of units for permeability and dielectric constant respectively such that both the permeability and the dielectric constant are relative to the respective free space values. In these relative units the impedance of any medium is the square root of the ratio of permeability to dielectric constant and the impedance of free space (or air) is unity.

Impedance matching between the ferromagnetic medium and any other medium may be achieved by making the ratio of the effective permeability to the effective dielectric constant the same for both media by controlling the value of the effective permeability of the ferromagnetic medium.

By a change in the control potential of a suitable amount, as by means of the source 15, the partition 12 may be rendered highly reflective by introducing an impedance mismatch thereby substantially preventing electromagnetic waves from being transmitted through the partition.

If desired, any suitable difference in gas pressure may be maintained on the two sides of the partition 12 in well known manner while at the same time electromagnetic waves may be passed through the partition or stopped at will without the use of any moving parts or at any time allowing escape of gas from one side of the partition to the other. Likewise, a fluid may be contained on either side of the partition without leakage during the process of switching or controlling the electromagnetic waves.

For the better understanding of the principles underlying the present invention, the following theoretical discussion and mathematical treatment is offered at this point before proceeding with the description of further embodiments of the invention.

In a ferromagnetic medium where conductance can be neglected and there is no divergence of the electric field or of the magnetic field, Maxwell's equations may be applied in the following form:

$$\operatorname{curl} \overline{E} = -\frac{1}{c} \frac{\partial \overline{b}}{\partial t} \qquad (1)$$

$$\operatorname{curl} \overline{h} = \frac{\epsilon}{c} \frac{\partial \overline{E}}{\partial t} \qquad (2)$$

where $\overline{E}$ is the electric field vector, $\overline{h}$ the alternating magnetic field vector, $\overline{b}$ the alternating magnetic flux vector, $\epsilon$ the dielectric constant of the medium, and $c$ the velocity of light. It is assumed that any static fields present have no variation from point to point in the medium so that curl $\overline{E}$ and curl $\overline{h}$ include the entire curl of the electric field and the magnetic field respectively and the static field may be left out of consideration without affecting the validity of wave equations derivable from Equations 1 and 2.

Assuming that a plane wave may be propagated in the medium in the direction of the y-axis, then $\overline{b}$, $\overline{h}$ and $\overline{E}$ each will have as a factor the quantity exp $(j\omega t - \Gamma y)$. Designating the amplitudes of the vector components along the respective axes as $h_x$, $h_y$ and $h_z$ for $\overline{h}$; $b_x$, $b_y$ and $b_z$ for $\overline{b}$; and $E_x$, $E_y$ and $E_z$ for $\overline{E}$, the respective vectors may be expressed as follows:

$$\overline{E} = (E_x \overline{i} + E_y \overline{j} + E_z \overline{k}) \exp (j\omega t - \Gamma y)$$
$$\overline{b} = (b_x \overline{i} + b_y \overline{j} + b_z \overline{k}) \exp (j\omega t - \Gamma y)$$
$$\overline{h} = (h_x \overline{i} + h_y \overline{j} + h_z \overline{k}) \exp (j\omega t - \Gamma y)$$

where $\overline{i}$, $\overline{j}$, $\overline{k}$, are unit vectors along the $x$, $y$, $z$, axes respectively. The amplitudes of the vector components along the respective axes are assumed constants independent of time and independent of the space coordinates $x$, $y$ and $z$. Accordingly, the only variations with respect either to time or to space are contained in the factor exp $(j\omega t - \Gamma y)$.

Upon the assumptions made, the type of wave equation resulting from Maxwell's equations will next be determined.

Noting that all terms of curl $\overline{E}$ and curl $\overline{h}$ which involve $$\frac{\partial}{\partial x} \text{ or } \frac{\partial}{\partial z}$$

are zero due to the fact that the only partial space derivatives that exist are in the direction of the y-axis, and also performing the partial time differentation of $\bar{b}$, Equation 1 gives:

$$\bar{i}E_z\frac{\partial}{\partial y}\exp(j\omega t-\Gamma y)$$

$$-\bar{k}E_x\frac{\partial}{\partial y}\exp(j\omega t-\Gamma y)=-\frac{j\omega}{c}\bar{b} \quad (3)$$

Similarly, Equation 2 gives:

$$\bar{i}h_z\frac{\partial}{\partial y}\exp(j\omega t-\Gamma y)$$

$$-\bar{k}h_x\frac{\partial}{\partial y}\exp(j\omega t-\Gamma y)=\frac{j\omega\epsilon}{c}\bar{E} \quad (4)$$

Equating the respective Cartesian coordinates on the two sides of Equation 4, performing the partial space differentiations, dividing out the common factor exp $(j\omega t-\Gamma y)$, and transposing the factor $(c/j\omega\epsilon)$, we have:

$$\left.\begin{array}{l}E_x=-\frac{c}{j\omega\epsilon}\Gamma h_z\\ E_y=0\\ E_z=\frac{c}{j\omega\epsilon}\Gamma h_x\end{array}\right\} \quad (5)$$

Similarly equating the respective Cartesian coordinates on the two sides of Equation 3:

$$\left.\begin{array}{l}E_x=-\frac{j\omega}{c\Gamma}b_z\\ 0=b_y\\ E_z=\frac{j\omega}{c\Gamma}b_x\end{array}\right\} \quad (6)$$

Equating corresponding quantities of Equations 5 and 6:

$$\left.\begin{array}{l}\frac{\omega^2\epsilon}{c^2}b_x=-\Gamma^2 h_x\\ b_y=0\\ \frac{\omega^2\epsilon}{c^2}b_z=-\Gamma^2 h_z\end{array}\right\} \quad (7)$$

which Equation 7 are the wave equations for the type of plane waves postulated, irrespective of the properties of the medium, which latter properties may be introduced when the relationship between the $b$ components and the $h$ components is known.

It has been shown by D. Polder in an article in Philosophical Magazine, volume 40, pages 99–115 (1949), that the phenomenon of gyromagnetic resonance in ferromagnetic substances may be explained in terms of the magnetic effects of the precession of spinning electrons about the direction of an impressed magnetic field. In accordance with Polder's analysis, if the static magnetizing field $H_z$ is applied to a ferromagnetic medium along the $z$-axis as hereinabove specified, and if there exists in the medium an alternating magnetic field in an arbitrary direction, the relationship between the hereinabove designated components $b_x$, $b_y$, $b_z$, of the alternating magnetic flux and $h_x$, $h_y$, $h_z$, of the alternating magnetic field, if the medium is magnetically saturated along the $z$-axis, is a tensor relationship as follows:

$$\left.\begin{array}{l}b_x=\mu h_x-jKh_y\\ b_y=jKh_x+\mu h_y\\ b_z=h_z\end{array}\right\} \quad (8)$$

where:

$$\mu=\frac{\gamma^2 H_z B_z-\omega^2}{\gamma^2 H_z^2-\omega^2} \quad (8')$$

$$K=\frac{4\pi M_z\gamma\omega}{\gamma^2 H_z^2-\omega^2} \quad (8'')$$

$\gamma$=gyromagnetic ratio for electrons (approximately $17.6\times 10^6$ radians per second per oersted),
$\omega$=angular frequency of the wave in radians per second,
$M_z$=magnetization of the medium by the static magnetizing field $H_z$,
$B_z=H_z+4\pi M_z$.

While in arriving at the Equations 8 Polder neglected the damping of the precessional motion of the electrons, his results so obtained are nevertheless found to be sufficiently accurate to be useful in explaining the operation of the various embodiments of the present invention described herein. Both $\mu$ and $K$ may in the general case be complex quantities, but under the assumption of negligible damping, these are seen from Expressions 8' and 8'' both to be real quantities. The $h$ and $b$ amplitudes, however, may be complex quantities in order to express mathematically any phase differences which may exist between the various components.

Equations 8 express the magnetic properties of the medium irrespective of the type of wave which may be transmitted through the medium. By substituting from Equations 8 into the Equations 7 we obtain the particular form of the wave equations valid for the type of plane waves postulated as being transmitted along the $y$-axis in the kind of ferromagnetic medium of the type analyzed by Polder, as follows:

$$\left.\begin{array}{l}\frac{\omega^2\epsilon}{c^2}(\mu h_x-jKh_y)=-\Gamma^2 h_x\\ \frac{\omega^2\epsilon}{c^2}(jKh_x+\mu h_y)=0\\ \frac{\omega^2\epsilon}{c^2}h_z=-\Gamma^2 h_z\end{array}\right\} \quad (9)$$

It will be noted that Equations 9 may be expressed as homogeneous linear equations in $h_x$, $h_y$, and $h_z$, as follows:

$$\left.\begin{array}{l}\left(\frac{\omega^2\epsilon\mu}{c^2}+\Gamma^2\right)h_x-\frac{j\omega^2\epsilon K}{c^2}h_y=0\\ \frac{j\omega^2\epsilon K}{c^2}h_x+\frac{\omega^2\epsilon\mu}{c^2}h_y=0\\ \left(\frac{\omega^2\epsilon}{c^2}+\Gamma^2\right)h_z=0\end{array}\right\} \quad (10)$$

Except in the unimportant case of $h_x$, $h_y$, and $h_z$, all equal to zero, it is necessary that the determinant of Equations 10 shall be equal to zero, that is:

$$\left[\frac{\omega^2\epsilon}{c^2}+\Gamma^2\right]\left[\frac{\omega^2\epsilon}{c^2}(\mu^2-K^2)+\mu\Gamma^2\right]=0 \quad (11)$$

Equations 11 determines two pairs of values for $\Gamma$ which may be designated $\Gamma_1$ and $\Gamma_2$ for convenience and which have the following values:

$$\Gamma_1^2=-\frac{\omega^2\epsilon}{c^2}$$

$$\Gamma_1=\pm j\frac{\omega}{c}\sqrt{\epsilon}$$

$$\Gamma_2^2=-\frac{\omega^2\epsilon}{c^2}\left(\frac{\mu^2-K^2}{\mu}\right)$$

$$\Gamma_2=\pm j\frac{\omega}{c}\sqrt{\left(\frac{\mu^2-K^2}{\mu}\right)\epsilon}$$

The coefficients $\Gamma_1$ and $\Gamma_2$ represent two modes of propagation possible for plane waves transmitted along the $y$-axis in the ferromagnetic medium. The two modes may occur separately or together. They occur separately in the following two special cases, respectively:

Case I, in which $h_z=0$;
Case II, in which $h_x=0$.

In Case I, Equations 10 reduce to $$\left.\begin{array}{r}-\dfrac{j\omega^2\epsilon K}{c^2}h_y=0\\[4pt]\dfrac{\omega^2\epsilon\mu}{c^2}h_y=0\\[4pt]\left(\dfrac{\omega^2\epsilon}{c^2}+\Gamma^2\right)h_z=0\end{array}\right\} \quad (12)$$

from which it is seen that $h_y=0$ and the propagation constant $\Gamma_1$. In this case, the only non-zero component of the alternating magnetic field is the component along the z-axis. This type of wave may be excited in the ferromagnetic medium by an impressed infinite plane wave having such a component.

In Case II, Equations 10 reduce to $$\left.\begin{array}{r}\left(\dfrac{\omega^2\epsilon\mu}{c^2}+\Gamma^2\right)h_x-\left(\dfrac{j\omega^2\epsilon K}{c^2}\right)h_y=0\\[4pt]\left(\dfrac{j\omega^2\epsilon K}{c^2}\right)h_x+\left(\dfrac{\omega^2\epsilon\mu}{c^2}\right)h_y=0\end{array}\right\} \quad (13)$$

From the second of Equations 13 we see that $h_x$ and $h_y$ are necessarily so related that $$h_y=-j\frac{K}{\mu}h_x \quad (14)$$

By substituting the value of $h_y$ in Equation 14 into the first of Equations 13 and solving for $\Gamma$ it is found that the solution is $\Gamma_2$. In this case the alternating magnetic field vector of the wave in the ferromagnetic medium is elliptically polarized and lies in the xy-plane. The electric vector is not disturbed as the wave enters the ferromagnetic medium and remains linearly polarized in the z-direction. This type of wave may be excited in the ferromagnetic medium by an impressed infinite plane wave having a non-zero electric component in the z-direction.

In the formulae for propagation constant $\Gamma_1$ or $\Gamma_2$, the factor by which $\epsilon$ is multiplied under the square root sign may be regarded as the effective alternating-current value of the permeability, because this factor takes the place of the permeability $\mu$ in the usual case of wave transmission in a medium where there is no appreciable gyromagnetic effect. In case I, the value of the propagation constant $\Gamma_1$ indicates that the effective permeability is unity, as in free space. Accordingly, the wave propagation in case I is not significantly different from that in vacuum or in air, is not affected by the influence of the spinning electrons in the ferromagnetic medium, and is of no further interest here. In case II, which is the case of interest in connection with the present invention, the effective permeability is found to be:

$$\mu_{eff}=\frac{\mu^2-K^2}{\mu} \quad (15)$$

The Expression 15 for the effective permeability may be translated into terms of readily measurable quantities by substituting the values of $\mu$ and $K$ from Expressions 8 and 8″ respectively with the following result:

$$\mu_{eff}=\frac{\gamma^2 B_z^2-\omega^2}{\gamma^2 H_z B_z-\omega^2} \quad (16)$$

the values of which have been computed and are plotted in Fig. 2 as a function of the static magnetizing field $H_z$ in oersteds for a practically attainable case in which $\omega=2\pi f$,
$f=9000$ megacycles per second,
$4\pi M_s=4\pi M_z=3000$ gauss.

The initial portion of the plot of $\mu_{eff}$ near the zero value of $H_z$ and extending up to magnetic saturation is obtained on the assumption that $H_z$ and $B_z$ are related as in the direct-current case, with the value of the direct-current permeability $\mu_{D.C.}$ taken as 100, that is, $$B_z=100H_z$$

which relationship is substituted into Expression 16. For $H_z$ equal to zero, Expression 16 reduces to $\mu_{eff}=1$.

Fig. 2 shows a zero value of $\mu_{eff}$ which is determined by $$\gamma^2 B_z-\omega^2=0 \quad (17)$$

and occurs where $B_z$ is 3210 gauss which in the example taken means $H_z$ is 210 oersteds. The figure also shows an infinite value of $\mu_{eff}$ which is determined by $$\gamma^2 H_z B_z-\omega^2=0 \quad (18)$$

and occurs where $B_z$ is 5040 gauss and $H_z$ is 2040 oersteds.

It will be noticed upon inspection of Fig. 2 that at zero magnetic field the effective permeability is unity and that it decreases rather rapidly toward zero in small fields. This part of the curve is an inverted mirror image of the magnetization curve for the material. The shape of this portion depends upon the direct-current permeability of the material. As the field is further increased and the material saturates, the effective permeability curve levels out somewhat and is much less field dependent until the region gyromagnetic resonance is approached.

The zero point of effective permeability, which for the case shown in Fig. 2 is at $H_z=210$ oersteds, may in the general case, depending upon the material and the operating frequency, occur either below or above the field value required for saturation. For the example taken in plotting Fig. 2, the zero point occurs at a field strength greater than is required for saturation.

It is readily predictable from Fig. 2 what is the behavior of a wave of the dominant mode being propagated in a wave guide through a ferromagnetic medium under the conditions for which Fig. 2 was plotted. Actually, the data for the plot of Fig. 2 is for the case of infinite extent of the ferromagnetic medium but the behavior of a wave in a piece of ferromagnetic material in a wave guide is found to be closely approximate to the behavior illustrated in Fig. 2.

At zero applied field, the wave sees a dielectric material with an effective permeability of unity and with an ordinary value of dielectric constant, for example, from 6 to 20 for ferrites at 9000 megacycles per second. As the field is gradually increased the permeability approaches zero very rapidly. As the permeability approaches zero, the wavelength in the medium becomes longer and longer and before a zero permeability is reached a phenomenon appears that is analogous to the kind of cut-off associated with a wave guide of critical width. However, since the propagation is taking place in a lossy dielectric, the cut-off is not as sharp as in a loss-less wave guide. Nevertheless, there is found to be a region of permeability close to zero where large reflections take place and very little power is propagated through a plug of the material which fills the wave guide.

The intrinsic impedance of a dielectric material is $$Z=\sqrt{\frac{\mu}{\epsilon}}$$

where $\mu$ is the permeability and $\epsilon$ is the dielectric constant, both of which quantities may be complex quantities in the general case. Some ferrites have been found in which the imaginary part of both these quantities is negligibly small at frequencies of the order of 9000 megacycles per second except in the region of ferromagnetic resonance where the imaginary part of the permeability is large and represents absorption. Other ferrites have been found in which the imaginary part of the permeability or the dielectric constant or both cannot be neglected regardless of the strength of the applied magnetic field.

In particular, if the imaginary part of the permeability is negligible when the real part is zero, then the impedance of the ferromagnetic medium will be truly zero at this point regardless of the dielectric loss; and the medium will then have properties analogous to those of a material with very large conductance. A piece of ferrite will, under these conditions, completely reflect an incident wave.

A particular ferrite that is known to commerce by the trade name of Ferramic I satisfies the condition of having a negligible magnetic loss component at the point where the real part of the permeability is zero and this material can be made to almost completely reflect an electromagnetic wave at this point. Other ferrites, such as one known by the trade name of Ferramic G, which have appreciable magnetic loss at all magnetic field strengths up to and slightly beyond the field required for resonance, do not at any point have a truly zero impedance and cannot be used to produce a perfect reflector.

When the field is increased beyond the gyromagnetic resonance, it is possible to produce high positive values of effective permeability in the medium, and where the resonance absorption band is not too broad, it has been found possible to make the effective permeability of the medium equal to the dielectric constant where both these quantities are substantially pure real quantities. The intrinsic impedance of the ferromagnetic material is then equal to the intrinsic impedance of air. Under these conditions, no reflection occurs at a boundary between the material and the air and the material is rendered substantially as transparent to electromagnetic waves as air is.

Fig. 3 is a plot of effective permeability values for positive and negative circularly polarized waves propagated in a ferromagnetic medium along the z-axis as hereinbefore defined, instead of along the y-axis as in the case illustrated in Fig. 2. It will be noted that the plot of the effective permeability for the positive circularly polarized wave shown in Fig. 3 is qualitatively similar to the plot of the effective permeability shown in Fig. 2.

The equations of the waves for which the effective permeability is plotted in Fig. 3 are obtained from Maxwell's Equations 1 and 2 and Expression 8 for the tensor permeability of the ferromagnetic medium in a manner similar to that used hereinabove, except that instead of assuming propagation in the direction of the y-axis, propagation in the direction of the z-axis is assumed. In other words it will now be assumed that a plane wave may be propagated in the medium in the direction parallel to the direction of the static magnetizing field.

In this case the vectors $\bar{b}$, $\bar{h}$ and $\bar{E}$ each have has a factor the quantity $\exp (j\omega t - \Gamma z)$ and all terms of the curl $\bar{E}$ and curl $\bar{h}$ which involve $$\frac{\partial}{\partial x} \text{ or } \frac{\partial}{\partial y}$$

are zero. Taking these conditions into account and using the same type of mathematical treatment as before, it is found that $$\left. \begin{array}{l} \dfrac{\omega^2 \epsilon}{c^2}(\mu h_x - jK h_y) = -\Gamma^2 h_x \\[4pt] \dfrac{\omega^2 \epsilon}{c^2}(jK h_x + \mu h_y) = -\Gamma^2 h_y \\[4pt] \dfrac{\omega^2 \epsilon}{c^2} h_z = 0 \end{array} \right\} \quad (19)$$

from which it appears that $$h_z = 0$$

everywhere at all times and $$h_x = \pm jh_y$$

which indicates that the magnetic field of the wave in the ferromagnetic medium consists of two circularly polarized components lying in the xy-plane. Each such circularly polarized component has its own value of propagation constant, which values are found to be as follows:

$$\Gamma_+ = j\frac{\omega}{c}\sqrt{(\mu+K)\epsilon} \quad (20)$$

$$\Gamma_- = j\frac{\omega}{c}\sqrt{(\mu-K)\epsilon} \quad (21)$$

where $\Gamma_+$ is the propagation constant for a positive circularly polarized wave and $\Gamma_-$ is the propagation constant for a negative circularly polarized wave. The values of $\mu$ and $K$ are as previously given in Expressions 8' and 8" respectively. By convention, a circularly polarized wave is designated as a positive circularly polarized wave when the rotation of the electric vector of the wave is in the same direction as the positive electric current, as in a solenoid, which would produce the static magnetic field. When the rotation of the electric vector of the wave is in the direction opposite to that of the solenoidal current the circularly polarized wave is designated as a negative circularly polarized wave. A wave of either type may be excited in the ferromagnetic medium by an impressed positive circularly polarized wave or negative circularly polarized wave respectively. Both types of waves may be excited simultaneously by an impressed wave linearly polarized with its electric vector in the xy-plane.

By inspection of Expressions 20 and 21 it is seen that the effective permeabilities are unequal for the two waves. It is readily determined that the respective values are:

$$\mu + K = 1 + \frac{4\pi M_z \gamma}{\gamma H_z - \omega} \quad (22)$$

$$\mu - K = 1 + \frac{4\pi M_z \gamma}{\gamma H_z + \omega} \quad (23)$$

These values of effective permeability are plotted in Fig. 3 as functions $H_z$. The plot corresponding to Expression 22 is for the positive circularly polarized wave and exhibits the zero and infinite values as exhibited by the plot in Fig. 2, but with the infinite value coming at a higher value of magnetic field.

Fig. 4 shows a system which may be employed either as a variable phase shifter or as a modulator. A wave guide section 40 of the hollow-pipe type of circular cross section is provided with a pencil-like piece 41 of ferromagnetic material having tapered end portions 42 and 43 and supported in the longitudinal axis of the section 40 by suitable supporting means such as a ring 80 of polystyrene foam. A magnetic core 44 is provided with pole pieces 45 and 46 defining an air gap containing the wave guide section 40 and the pencil 41. An energizing winding 47 is provided upon the structure 44 and is connected to a potentiometer 48 and switches 49 and 50, which permit the selection of either a source 51 of modulating potentials or a source 52 of saw-tooth waves for controlling the magnetizing field in the pencil 41.

In the operation of the system of Fig. 4 as a variable phase shifter, the potentiometer 48 is adjusted to a relatively small value of potential so as to place the pencil 41 in the range of magnetizing field below the point of zero effective permeability, or for some uses the potentiometer may be dispensed with and only the source of saw-tooth waves connected to the winding 47, as by throwing switch 50 to the lower position and throwing switch 49 to the upper position.

In the first case, the phase shift of an electromagnetic wave passing through the wave guide section 40 may be varied manually by means of the potentiometer 48 which in effect varies the permeability of the transmission path and hence varies the phase shift.

In the second case, the application of a saw-tooth wave from the source 52 causes the permeability of the path to vary in a substantially linear manner over a wide range, thereby smoothly varying the phase shift over a desired range and periodically repeating the process. The magnetizing field utilized in either this or the first case is relatively very weak.

The variation of the phase shift in the second case is effected without any moving parts whatsoever and it is found that a range of phase shifts of 360 degrees or more may readily be effected.

In the operation of the system of Fig. 4 as a modulator, the switches 49 and 50 are both placed initially in the upper portion and the potentiometer 48 is adjusted to give a condition of partial absorption in the pencil 41 in the immediate neighborhood of gyromagnetic resonance. A source of electromagnetic waves of the transverse electric type with the electric vector vertical (parallel to the magnetizing field between the pole pieces 45 and 46) may be coupled to one end of wave guide section 40 to serve as a source of unmodulated carrier waves. The switch 49 may then be thrown to the lower position connecting the source 51 to vary the magnetizing field in accordance with modulating potentials. The addition of the modulating potentials causes the amount of absorption in the pencil 41 to increase and decrease from its initial value thereby modulating the electromagnetic wave as it passes through and around the pencil 41.

An illustrative example of a suitable size for the pencil 41 for use in a circular wave guide of one inch diameter is one-quarter inch diameter and three-quarters of an inch long, with the tapering extensions 42 and 43 each three-quarters of an inch long, making an over all length of two and a quarter inches. These proportions are not critical and considerable variations may be made in them without impairing the operation of the device. Where the size and length of the pencil is not important, the pencil may be enlarged to constitute a plug completely filling the wave guide, thereby increasing the effectiveness of the pencil in influencing the transmission of the impressed wave. The tapered sections must then be longer in order to preserve substantially the same angle of taper. Accordingly, each tapered section will need to be three inches long, making the over all length of the ferromagnetic element six and three-quarters inches, which might be a disadvantage in some applications of the invention.

Fig. 5 shows a system for varying the transparency of an obstacle to wave transmission by magnetic means when the wave to be transmitted is circularly polarized. A section 55 of hollow-pipe wave guide of circular cross section is provided with a plug 56 of ferromagnetic material and a solenoidal winding 57 surrounding the plug 56. The winding 57 is connected through a switch 58 to a potentiometer 59. The switch 58 has two positions, connected to different points on the potentiometer. The upper position is selected to produce in the plug 56 a condition of substantially complete transparency for a positive circularly polarized wave, as governed by Expression 22. The degree of transparency is readily adjustable by means of a movable contactor 70. The lower position is selected to produce in the plug 56 a condition of substantially complete reflection. The switch 49 and source 51 may be incorporated in one of the leads to the winding 57.

In the operation of the system of Fig. 5 to change the plug abruptly from transparent to reflective or vice versa, a positive circularly polarized wave is impressed upon one end of the wave guide section 55 and the switch 58 is set to either position necessary to effect transmission through the plug 56 or reflection at the plug 56 as desired. As this embodiment involves the utilization of reflection, the plug 56 is preferably devoid of tapered end portions for the reduction of reflection such as are shown at 42 and 43 in Fig. 4.

In the operation of the system of Fig. 5 to continuously vary the transparency under the control of a source of modulating potentials, the contactor 70 may be adjusted to give a condition of partial transparency in the plug 56 in the immediate neighborhood of maximum transparency. The switch 49 may then be thrown to its lower position connecting the source 51 to vary the magnetizing field in accordance with modulating potentials.

Fig. 6 shows a system for converting a linearly polarized wave into a circularly polarized wave. The figure shows a hollow-pipe wave guide section 65 of circular cross section provided with a plug 66 of ferromagnetic material and a magnetizing solenoid 67 connected to a source 68 of magnetizing current such as a battery. The potential of the source 68 is adjusted to such a value as to render the plug 66 totally reflecting to a positive circularly polarized wave. A linearly polarized transverse electric wave is impressed upon one end of the wave guide section 65. Upon striking the plug 66, the linearly polarized wave excites two circularly polarized waves in the material of the plug 66, one circularly polarized wave being positive and the other negative. The positive circularly polarized wave is totally reflected in the surface region of the plug 66 while the negative circularly polarized wave is partially reflected and partially transmitted through the plug 66. The result is that the negative circularly polarized wave alone emerges from the far end of the plug 66 and sets up a circularly polarized wave in the portion of the wave guide section 65 beyond the plug.

It can be shown that complete reflection of a wave is obtained when the value of the effective permeability is zero and also over a considerable range wherein the effective permeability is negative and where there is at the same time no appreciable absorption of energy due to resonance. This may be derived from a consideration of the reflection coefficient $\rho$ for a junction between two media having characteristic impedances $Z_1$ and $Z_2$ respectively, for which the conventional expression is $$\rho = \frac{Z_1 - Z_2}{Z_1 + Z_2}$$

If the impedances are expressed relative to the impedance of free space, and the medium having the impedance $Z_1$ is air, then $$\rho = \frac{1 - Z_2}{1 + Z_2}$$

For the second medium $$Z_2 = \sqrt{\frac{\mu}{\epsilon}}$$

Now if $\mu$ is zero, $Z_2$ is zero, and the reflection coefficient is unity, indicating complete reflection. Furthermore, if $\mu$ is negative instead of zero, and there is no dissipation, $$Z_2 = \pm j\sqrt{\left|\frac{\mu}{\epsilon}\right|}$$

which is a pure reactance. Therefore $(1-Z_2)$ and $(1+Z_2)$ are quantities that are equal in magnitude. Hence the amplitude of $\rho$ is unity, again denoting complete reflection. Hence the region of complete reflection extends from the point of zero effective permeability up until the resonance absorption in the ferromagnetic material begins to become appreciable.

In any of the embodiments of the invention illustrated, the ferromagnetic element may be replaced by a container of gas or liquid which has a suitable gyromagnetic absorption characteristic with a resonance not too far removed from the intended frequency of the incident waves. Among suitable materials are gases trapped in a clathrate molecular structure, as gas so trapped is equivalent to ordinary gas at enormous pressure and great density and is capable of producing large ferromagnetic effects.

External sources of static magnetic field may be dispensed with where it is possible to use a suitable ferromagnetic substance that can be permanently magnetized.

As a consequence of the qualitative similarity of the curves of effective permeability as shown in Figs. 2 and 3, respectively, for many embodiments of the invention wherein a linearly polarized impressed wave is employed an analogous corresponding embodiment may readily be derived by one skilled in the art for use with a positive circularly polarized impressed wave, and vice versa.

It is understood that the above-described arrangements are illustrative of the application of the principles of the invention. Numerous other arrangements may be devised by those skilled in the art without departing from the spirit and scope of the invention.

What is claimed is:

1. In a microwave transmission system, means for propagating electromagnetic wave energy having a magnetic field pattern forming closed loops with a portion of said loops being predominantly transverse to the direction of propagation of said energy and a portion thereof being predominantly parallel to the direction of propagation of said energy, means for introducing said energy within a specified operating range of high frequencies into said system at one point, a load associated with said system at another point for utilizing said energy after propagation from said one point to said other point, a solid member of gyromagnetic material disposed in the path of said energy between said points in the presence of said transverse portion of said pattern, and means for impressing upon said member in a direction perpendicular to said transverse portion a unidirectional magnetizing field of a strength to cause the effective permeability presented by said member to said high frequency energy to be positive and greater than unity and to equal the dielectric constant of said member to render said member substantially transparent to said wave energy at the operating frequency, said strength being above that necessary to produce gyromagnetic resonance in said member at said operating frequency.

2. In a microwave transmission system, means for propagating linearly polarized electromagnetic wave energy having a magnetic field pattern forming closed loops with a portion of said loops being predominantly transverse to the direction of propagation of said energy and a portion thereof being predominantly parallel to the direction of propagation of said energy, means for introducing said energy within a specified operating range of high frequencies into said system at one point, a load associated with said system at another point for utilizing said energy after propagation from said one point to said other point, a solid member of gyromagnetic material disposed in the path of said energy between said points in the presence of said transverse portion of said pattern, and means for impressing upon said member in a direction parallel to the electric vector of said energy as well as perpendicular to said transverse portion a unidirectional magnetizing field of a strength to cause the effective permeability presented by said member to said high frequency energy to be positive and greater than unity and to equal the dielectric constant of said member to render said member substantially transparent to said wave energy at the operating frequency, said strength being above that necessary to produce gyromagnetic resonance in said member at said operating frequency.

3. In a microwave transmission system, means for propagating electromagnetic wave energy which is circularly polarized in one sense having a magnetic field pattern forming closed loops with a portion of said loops being predominantly transverse to the direction of propagation of said energy and a portion thereof being predominantly parallel to the direction of propagation of said energy, means for introducing said energy within a specified operating range of high frequencies into said system at one point, a load associated with said system at another point for utilizing said energy after propagation from said one point to said other point, a solid member of gyromagnetic material disposed in the path of said energy between said points in the presence of said transverse portion of said pattern, and means for impressing upon said member in a direction parallel to the direction of propagation of said energy as well as perpendicular to said transverse portion a unidirectional magnetizing field of a strength to cause the effective permeability presented by said member to said high frequency energy to be positive and greater than unity and to equal the dielectric constant of said member to render said member substantially transparent to said wave energy at the operating frequency, said strength being above that necessary to produce gyromagnetic resonance in said member at said operating frequency.

4. In combination, a hollow pipe type of wave guide adapted to support high frequency electromagnetic wave energy within a specified operating range of frequencies, means for introducing said wave energy into said guide at one point, a load associated with said guide at another point for utilizing said energy after propagation from said one point to said other point, said energy having a magnetic field pattern forming closed loops with a portion of said loops being predominantly transverse to the direction of propagation of said energy and a portion thereof predominantly parallel to the direction of propagation of said energy, a solid member of gyromagnetic material interposed in said guide between said points in the path of said energy and in the presence of said transverse portion, means for impressing a unidirectional magnetizing field upon said member in a direction perpendicular to said transverse portion, and means for switching between a first and a second value of said magnetizing field, said first value being that value greater than that necessary to produce gyromagnetic resonance in said member at the operating frequency for which said member presents to said high frequency energy an effective permeability that is positive and greater than unity and equal to its dielectric constant to render said member substantially transparent to said high frequency wave energy, said second value being that value less than that necessary to produce gyromagnetic resonance in said member at the operating frequency for which said member presents substantially zero effective permeability to said high frequency energy to render said member substantially reflective to said wave energy.

5. In combination, a hollow pipe type of wave guide adapted to support high frequency linearly polarized electromagnetic wave energy within a specified operating range of frequencies, means for introducing said wave energy into said guide at one point, a load associated with said guide at another point for utilizing said energy after propagation from said one point to said other point, said energy having a magnetic field pattern forming closed loops with a portion of said loops being predominantly transverse to the direction of propagation of said energy and a portion thereof predominantly parallel to the direction of propagation of said energy, a solid member of gyromagnetic material interposed in said guide between said points in the path of said energy and in the presence of said transverse portion, means for impressing a unidirectional magnetizing field upon said member in a direction transverse to the direction of propagation of said energy as well as perpendicular to said transverse portion, and means for switching between a first and a second value of said magnetizing field, said first value being that value greater than that necessary to produce gyromagnetic resonance in said member at the operating frequency for which said member presents to said high frequency energy an effective permeability that is positive and greater than unity and equal to its dielectric constant to render said member substantially transparent to said high frequency wave energy, said second value being that value less than that necessary to produce gyromagnetic resonance in said member at the operating frequency for which said member presents substantially zero effective permeability to said high frequency energy to render said member substantially reflective to said wave energy.

6. In combination, a hollow pipe type of wave guide adapted to support high frequency electromagnetic wave energy which is circularly polarized in one sense within a specified operating range of frequencies, means for introducing said wave energy into said guide at one point, a load associated with said guide at another point for utilizing said energy after propagation from said one point to said other point, said energy having a magnetic field pattern forming closed loops with a portion of said loops being predominantly transverse to the direction of propagation of said energy and a portion thereof predominatnly parallel to the direction of propagation of said energy, a solid member of gyromagnetic material interposed in said guide between said points in the path of said energy and in the presence of said transverse portion, means for impressing a unidirectional magnetizing field upon said member in a direction parallel to the direction of propagation of said energy as well as perpendicular to said transverse portion, and means for switching between a first and a second value of said magnetizing field, said first value being that value greater than that necessary to produce gyromagnetic resonance in said member at the operating frequency for which said member presents to said high frequency energy an effective permeability that is positive and greater than unity and equal to its dielectric constant to render said member substantially transparent to said high frequency wave energy, said second value being that value less than that necessary to produce gyromagnetic resonance in said member at the operating frequency for which said member presents substantially zero effective permeability to said high frequency energy to render said member substantially reflective to said wave energy.

7. In a microwave transmission system, means for propagating electromagnetic wave energy having a magnetic field pattern forming closed loops with a portion of said loops being predominantly transverse to the direction of propagation of said energy and a portion thereof being predominantly parallel to the direction of propagation of said energy, said means having a characteristic impedance $Z_0$, means for introducing said energy within a specified operating range of high frequencies into said system at one point, a load associated with said system at another point for utilizing said energy after propagation from said one point to said other point, a solid member of gyromagnetic material disposed in the path of said energy between said points in the presence of said transverse portion of said pattern, and means for impressing upon said member in a direction perpendicular to said transverse portion a unidirectional magnetizing field of a strength to cause the effective permeability $\mu$ presented by said member to said high frequency energy to be positive and greater than unity and to equal $(Z_0)^2\epsilon$ where $\epsilon$ is the dielectric constant of said member to render said member substantially transparent to said wave energy at the operating frequency, said strength being above that necessary to produce gyromagnetic resonance in said member at said operating frequency.

References Cited in the file of this patent

UNITED STATES PATENTS

| | | |
|---|---|---|
| 2,051,537 | Wolff et al. | Aug. 18, 1936 |
| 2,454,530 | Tiley | Nov. 23, 1948 |
| 2,483,818 | Evans | Oct. 4, 1949 |
| 2,607,031 | Denis et al. | Aug. 12, 1952 |
| 2,610,250 | Wheeler | Sept. 9, 1952 |
| 2,644,930 | Luhrs et al. | July 7, 1953 |
| 2,745,069 | Hewett | May 8, 1956 |

FOREIGN PATENTS

| | | |
|---|---|---|
| 171,660 | Australia | June 25, 1952 |

OTHER REFERENCES

Article "Microwave Antenna Ferrite Applications," pages 156–166 of Electronics for June 1952.

Philips Techincal Review, May 1950, p. 318.